(12) United States Patent
Wu et al.

(10) Patent No.: US 11,709,420 B2
(45) Date of Patent: Jul. 25, 2023

(54) METHOD OF METAL MASK AND MANUFACTURING METHOD OF METAL MASK

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Jianpeng Wu, Beijing (CN); Weiwei Ding, Beijing (CN); Zhongying Yang, Beijing (CN); Chang Luo, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 544 days.

(21) Appl. No.: 16/080,803

(22) PCT Filed: Jan. 10, 2018

(86) PCT No.: PCT/CN2018/072082
§ 371 (c)(1),
(2) Date: Aug. 29, 2018

(87) PCT Pub. No.: WO2018/227961
PCT Pub. Date: Dec. 20, 2018

(65) Prior Publication Data
US 2021/0187576 A1    Jun. 24, 2021

(30) Foreign Application Priority Data
Jun. 15, 2017    (CN) .......................... 201710452420.7

(51) Int. Cl.
*G03F 1/36*    (2012.01)
*B21D 11/02*   (2006.01)
(Continued)

(52) U.S. Cl.
CPC ................ *G03F 1/36* (2013.01); *B21D 11/02* (2013.01); *B29C 55/00* (2013.01); *B29C 55/065* (2013.01);
(Continued)

(58) Field of Classification Search
CPC .......... G03F 7/70783; G03F 1/36; G03F 1/72; H01L 51/0011
See application file for complete search history.

(56) References Cited

U.S. PATENT DOCUMENTS 7,444,616 B2 * 10/2008 Sandstrom .......... G03F 7/70783
700/121
7,535,549 B2 *  5/2009 Cherala .................. B82Y 10/00
355/75
(Continued)

FOREIGN PATENT DOCUMENTS

CN    104561893 A    4/2015
CN    104611669 A    5/2015
(Continued)

OTHER PUBLICATIONS

CN-107329374-B machine translation (Year: 2019).*
(Continued)

*Primary Examiner* — Michael W Hotchkiss
(74) *Attorney, Agent, or Firm* — Nath, Goldberg & Meyer; Joshua B. Goldberg (57) ABSTRACT

A design method of a metal mask, a manufacturing method of the metal mask and a computer-readable storage medium are provided. The design method of a metal mask includes: calculating amounts of deformations of the metal mask in
(Continued)

two directions perpendicular to each other based on a stretching force of the metal mask in use and deformation properties of the metal mask in the two directions; and compensating the deformations of the metal mask in the two directions by compensation amounts for the deformations, which are identical and opposite to the amounts of the deformations of the metal mask in the two directions, respectively.

6 Claims, 3 Drawing Sheets

(51) Int. Cl.
    *B29C 55/00*      (2006.01)
    *B29C 55/06*      (2006.01)
    *B29C 55/08*      (2006.01)
    *G01F 1/36*      (2006.01)
    *G01F 1/44*      (2006.01)
    *H01L 21/66*      (2006.01)
    *C23C 14/04*      (2006.01)

(52) U.S. Cl.
    CPC .............. *B29C 55/085* (2013.01); *G01F 1/36* (2013.01); *G01F 1/44* (2013.01); *H01L 22/12* (2013.01); *C23C 14/042* (2013.01)

(56) References Cited

U.S. PATENT DOCUMENTS

| | | | | |
|---|---|---|---|---|
| 9,705,083 | B2* | 7/2017 | Obata | C23C 14/042 |
| 10,365,558 | B2* | 7/2019 | Jansen | G03F 7/70983 |
| 2002/0059903 | A1* | 5/2002 | Hasegawa | C23C 14/042 |
| | | | | 118/504 |
| 2005/0271955 | A1* | 12/2005 | Cherala | G03F 7/70783 |
| | | | | 430/22 |
| 2007/0111465 | A1* | 5/2007 | Yoshizawa | G03F 1/20 |
| | | | | 117/106 |
| 2008/0098911 | A1* | 5/2008 | Yanagihara | H05K 3/1225 |
| | | | | 101/127.1 |
| 2008/0131795 | A1* | 6/2008 | Gallagher | G03F 1/60 |
| | | | | 430/5 |
| 2011/0171768 | A1* | 7/2011 | Hong | C23C 14/042 |
| | | | | 257/E33.001 |
| 2012/0009511 | A1* | 1/2012 | Dmitriev | G03F 1/84 |
| | | | | 430/5 |
| 2017/0141315 | A1* | 5/2017 | Ikenaga | H01L 51/0011 |
| 2017/0270230 | A1* | 9/2017 | Rosenbluth | G03F 1/36 |
| 2020/0080186 | A1* | 3/2020 | Liu | C23C 14/042 |

FOREIGN PATENT DOCUMENTS

| | | | | |
|---|---|---|---|---|
| CN | 107227438 A | | 10/2017 | |
| CN | 104561893 B | * | 2/2018 | ........... C23C 14/042 |
| CN | 107329374 B | * | 6/2019 | ............... G03F 1/44 |
| JP | 987829 A | | 3/1997 | |

OTHER PUBLICATIONS

CN-104561893-B machine translation (Year: 2018).*
Babulal, SCF on Isotropic Rectangular Plate With Central Circular Hole . . . , May 2015, pp. 114-115 (Year: 2015).*
International Search Report dated Apr. 20, 2018 corresponding to application No. PCT/CN2018/072082.
First Office Action dated Dec. 12, 2018 corresponding to Chinese application No. 201710452420.7.
Applied Mechanics (I) and the English Abstract; 1981.

* cited by examiner

Fig. 1

Fig. 2 calculating amounts of deformations of the metal mask in two directions perpendicular to each other based on a stretching force of the metal mask in use and deformation properties of the metal mask in the two directions

↓ compensating the deformations of the metal mask in the two directions by compensation amounts for the deformations, which are identical and opposite to the amounts of the deformations of the metal mask in the two directions, respectively

METHOD OF METAL MASK AND MANUFACTURING METHOD OF METAL MASK

CROSS-REFERENCE TO RELATED APPLICATION

The present disclosure is a National Phase Application filed under 35 U.S.C. 371 as a national stage of PCT/CN2018/072082, filed Jan. 10, 2018, an application claiming the benefit of Chinese Patent Application No. 201710452420.7, filed in China on Jun. 15, 2017, the disclosure of each of which is hereby incorporated by reference in its entirety.

TECHNICAL FIELD

The present disclosure relates to the field of display technology, in particular, to a design method of a metal mask and a manufacturing method of a metal mask.

BACKGROUND

With the development of technology, an Organic Light Emitting Diode (OLED) display device has gone deep into the people's life increasingly. For manufacturing the OLED display device, evaporation of small molecules with a fine metal mask (FMM) is widely used, in which an organic light emitting material is evaporated to specific locations on a back panel including a thin film transistor through openings in the multi-layer fine metal mask so as to achieve a color display.

SUMMARY

According to an aspect of the present disclosure, provided is a design method of a metal mask which includes the steps of: calculating amounts of deformations of the metal mask in two directions perpendicular to each other based on a stretching force of the metal mask in use and deformation properties of the metal mask in the two directions; and compensating the deformations of the metal mask in the two directions by compensation amounts for the deformations, which are identical and opposite to the amounts of the deformations of the metal mask in the two directions, respectively.

In some implementations, the design method further includes a step of acquiring the deformation properties of the metal mask in the two directions, which includes: determining design dimensions of the metal mask; acquiring material properties of a material for manufacturing the metal mask; and calculating the deformation properties of the metal mask in the two directions based on the design dimensions of the metal mask and the material properties of the material for manufacturing the metal mask.

In some implementations, the design dimensions of the metal mask include a length, a width and a thickness of the metal mask, and a cross-sectional area of an opening in the metal mask, a lateral interval and a longitudinal interval between two adjacent openings in the metal mask; and the material properties of the material for manufacturing the metal mask include Young's modulus and Poisson's ratio.

In some implementations, the deformation properties of the metal mask in the two directions include:

Young's modulus $E_x$ of the metal mask in a stretching direction, which is:

$$E_x = E \times e/(a+e);$$

Young's modulus $E_y$ of the metal mask in a direction perpendicular to the stretching direction, which is:

$$E_y = E \times b/(c+b); \text{ and}$$

Poisson's ratio v of the metal mask, which is:

$$v = v_0 \times l/w \times ((a+e)*(b+c)/(a \cdot b))^{1/2},$$

wherein the width of the metal mask is w, the length of the metal mask is l, the cross-sectional area of the opening in the metal mask is a·b, the lateral interval is e, the longitudinal opening interval is c, the material for manufacturing the metal mask has Young's modulus E and Poisson's ratio $v_0$.

In some implementations, the stretching force applied to the metal mask is F, and the deformation properties further include:

a cross-sectional normal stress $\sigma_x$ of the metal mask in the stretching direction, which is:

$$\sigma_x = F/(w \times t);$$

a cross-sectional elongation $\Delta l$ of the metal mask in the stretching direction, which is:

$$\Delta l = \pm F \times l/(E_x \times w \times t);$$

a cross-sectional normal strain $\varepsilon_x$ of the metal mask in the stretching direction, which is:

$$\varepsilon_x = \Delta l/l = \sigma_x/E_x; \text{ and}$$

a relationship between the normal strain $\varepsilon_x$ of the metal mask in the stretching direction and a normal strain $\varepsilon_y$ of the metal mask in a direction perpendicular to the stretching direction, which is:

$$\varepsilon_x = -v \times \varepsilon_y,$$

wherein, t is the thickness of the metal mask.

In some implementations, taking a correction parameter $C_1$ into account, the deformation properties further includes:

the cross-sectional normal stress $\sigma_x$ of the metal mask in the stretching direction, which is:

$$\sigma_x = F/(w \times C_1 \times t);$$

the cross-sectional elongation $\Delta l$ of the metal mask in the stretching direction, which is:

$$\Delta l = \pm F \times l/[E_x \times (w \times C_1 \times t)];$$

the cross-sectional normal strain $\varepsilon_x$ of the metal mask in the stretching direction, which is:

$$\varepsilon_x = \Delta l/l = \sigma_x/E_x;$$

the relationship between the normal strain $\varepsilon_x$ of the metal mask in the stretching direction and the normal strain $\varepsilon_y$ of the metal mask in the direction perpendicular to the stretching direction, which is:

$$\varepsilon_x = -v \times \varepsilon_y.$$

In some implementations, the correction parameter $C_1$ is related to an etching process for forming the opening.

In some implementations, the correction parameter $C_1$ is related to the thickness of the metal mask and an inclination angle of the opening with respect to a plane in which the metal mask is located.

In some implementations, the correction parameter $C_1$ ranges from ½ to ¼

In some implementations, a compensation amount for the deformation of the metal mask in the stretching direction is:

$$T.R._x = \Delta l/l\% = \sigma_x/E_x\%; \text{ and}$$

a compensation amount for the deformation of the metal mask in the direction perpendicular to the stretching direction is:

$$T.R._y = \Delta w/w\% = \varepsilon_y\% = -T.R._x/v\%$$

In some implementations, a cross section of the opening is rectangular, a long side of the opening is in a same direction as that of a long side of the metal mask; the stretching direction of the metal mask is a direction of the long side thereof, and the direction perpendicular to the stretching direction is a direction of a short side thereof.

According to an aspect of the present disclosure, provided is a manufacturing method of a metal mask which includes: performing a deformation compensation on the metal mask in two directions perpendicular to each other according to the above design method.

According to an aspect of the present disclosure, provided is a computer-readable storage medium in which computer programs are stored, wherein the computer programs implement, when executed by a processor, the following steps: calculating amounts of deformations of the metal mask in two directions perpendicular to each other based on a stretching force of the metal mask in use and deformation properties of the metal mask in the two directions; and compensating the deformations of the metal mask in the two directions by compensation amounts for the deformations, which are identical and opposite to the amounts of the deformations of the metal mask in the two directions, respectively.

In some implementations, the computer programs further implement, when executed by a processor, the following steps: determining design dimensions of the metal mask; acquiring material properties of a material for manufacturing the metal mask; and calculating the deformation properties of the metal mask in the two directions based on the design dimensions of the metal mask and the material properties of the material for manufacturing the metal mask.

In some implementations, the design dimensions of the metal mask include a length, a width and a thickness of the metal mask, a cross-sectional area of an opening in the metal mask, a lateral interval and a longitudinal interval between two adjacent openings in the metal mask; and the material properties of the material for manufacturing the metal mask include Young's modulus and Poisson's ratio.

In some implementations, the computer programs further implement, when executed by a processor, calculating the deformation properties of the metal mask in the two directions:

Young's modulus $E_x$ of the metal mask in a stretching direction, which is:

$$E_x = E \times e/(a+e);$$

Young's modulus $E_y$ of the metal mask in a direction perpendicular to the stretching direction, which is:

$$E_y = E \times b/(c+b); \text{ and}$$

Poisson's ratio v of the metal mask, which is:

$$v = v_0 \times l/w \times ((a+e)*(b+c)/(a \cdot b))^{1/2},$$

wherein the width of the metal mask is w, the length of the metal mask is l, the cross-sectional area of the opening in the metal mask is a·b, the lateral interval is e, the longitudinal interval is c, the material for manufacturing the metal mask has Young's modulus E and Poisson's ratio $v_0$.

In some implementations, the stretching force applied to the metal mask is F, and the deformation properties further include:

a cross-sectional normal stress $\sigma_x$ of the metal mask in the stretching direction, which is:

$$\sigma_x = F/(w \times t);$$

a cross-sectional elongation $\Delta l$ of the metal mask in the stretching direction, which is:

$$\Delta l = \pm F \times l/(E_x \times w \times t);$$

a cross-sectional normal strain $\varepsilon_x$ of the metal mask in the stretching direction, which is:

$$\varepsilon_x = \Delta l/l = \sigma_x/E_x; \text{ and}$$

a relationship between the normal strain $\varepsilon_x$ of the metal mask in the stretching direction and a normal strain $\varepsilon_y$ of the metal mask in a direction perpendicular to the stretching direction, which is:

$$\varepsilon_x = -v \times \varepsilon_y,$$

wherein, t is the thickness of the metal mask.

In some implementations, the computer programs further implement, when executed by a processor, the following: taking a correction parameter $C_1$ into account, the deformation properties further include:

the cross-sectional normal stress $\sigma_x$ of the metal mask in the stretching direction, which is:

$$\sigma_x = F/(w \times C_1 \times t);$$

the cross-sectional elongation $\Delta l$ of the metal mask in the stretching direction, which is:

$$\Delta l = \pm F \times l/[E_x \times (w \times C_1 \times t)];$$

the cross-sectional normal strain $\varepsilon_x$ of the metal mask in the stretching direction, which is:

$$\varepsilon_x = \Delta l/l = \sigma_x/E_x; \text{ and}$$

the relationship between the normal strain $\varepsilon_x$ of the metal mask in the stretching direction and the normal strain $\varepsilon_y$ of the metal mask in the direction perpendicular to the stretching direction, which is:

$$\varepsilon_x = -v \times \varepsilon_y.$$

In some implementations, the correction parameter $C_1$ ranges from ½ to ¼.

In some implementations, the computer programs further implement, when executed by a processor, calculating a compensation amount for the deformation of the metal mask in the stretching direction:

$$T.R._x = \Delta l/l\% = \sigma_x/E_x\%; \text{ and}$$

a compensation amount for the deformation of the metal mask in the direction perpendicular to the stretching direction:

$$T.R._y = \Delta w/w\% = \varepsilon_y\% = -T.R._x/v\%.$$

DETAILED DESCRIPTION

In order that a person skilled in the art may understand the technical solutions of the present disclosure better, a design method of a metal mask and a manufacturing method of a metal mask of the present disclosure will be described in detail below in conjunction with the drawings and specific implementations.

Accuracy of a metal mask is required to be micron, and the accuracy requirement for matching and aligning the metal mask with the back panel of thin film transistors is very high. Generally, if an opening of a thin film transistor is displaced by more than 5 microns from a specific location of the back panel, the colors of the organic light emitting materials evaporated by former metal mask and a latter metal mask will interfere with each other during light emission, which results in "color mixture" of the display device during displaying. For example, a white image will appear to have a slight blue or pink color. The reasons for "color mixture" include the following factors: the design of the metal mask, the accuracy of the manufacturing by the manufacturer, the alignment accuracy in use, the "fatigue" and "relaxation" of the metal mask after multiple uses, attachment state to the back panel of the thin film transistors, and so on. All the above factors except the design factor may be improved by adjusting and improving the processes, and thus greater demands are being placed on the design of the metal mask.

Figure 1:
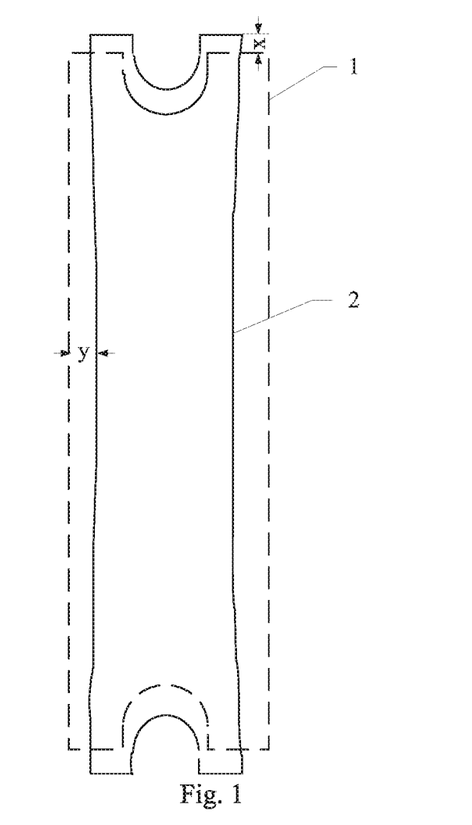
FIG. 1 is a schematic diagram illustrating a deformation trend of a metal mask.

A metal mask having been designed and manufactured is stretched and welded on a frame. The metal mask, which has a thickness of about dozens of microns, a length of about hundreds of microns and a width of about dozens to hundreds of microns, may be deformed greatly when a pulling force is applied to two ends of the metal mask, as shown in FIG. 1. Compared the designed metal mask 1 with the stretched and welded metal mask 2, it may be seen that the stretched and welded metal mask 2 has an extension deformation in the stretching direction and a shrinking deformation in the direction perpendicular to the stretching direction, which causes a displacement and deformation of openings in the metal mask, and a mismatch with the back panel of the thin film transistors occurs. Accordingly, when designing a metal mask, additional amounts for compensation are considered in the stretching direction and the shrinking direction, respectively, so that the metal mask may reach the desired location after the stretching or shrinking deformation. Currently, the amounts for compensation are obtained by measuring and calculating the alignment marks before and after the stretching and the shrinking of a manufactured metal mask as a sample. Although this manner can provide the amounts for compensation for the metal mask, it has a low efficiency and an increased process cost of the metal mask.

How to take the deformation amounts of the metal mask into consideration in the early stage of the design of a metal mask and obtain a metal mask involving the compensation amounts has become a technical problem to be solved urgently.

The technical concept of the present disclosure is as follows: the most fundamental reason that the metal mask (which is a very thin metal sheet) may have deformations in the stretching direction and the direction perpendicular to the stretching direction is that the deformation property of the metal mask is changed due to dense openings in the metal mask, and the dense openings in the metal mask are thus moved and deformed, thereby causing the mismatch with the back panel of the thin film transistors. Since the metal mask may be deformed during stretching and welding, the deformation should be taken into considered when designing the metal mask, and compensation amounts may be taken into account during designing to cancel out the deformation caused by stretching and welding the metal mask.

In view of the problem that the metal mask should be compensated in the length and width directions of the metal mask due to the presence of a tension ratio, the present embodiment provides a design method of a metal mask and correspondingly a manufacturing method of a metal mask in which a metal mask involving the compensation amounts is achieved by obtaining the compensation amounts for deformation by calculating directly, instead of manufacturing a sample mask in advance.

Generally, it is known that a metal mask has a stretching force F, a thickness t, a width w, and a length l, Young's modulus is E, and Poisson's ratio is $v_0$, then:

a cross-sectional normal stress $\sigma_x$ of the metal mask in the stretching direction is:

$$\sigma_x = F/w \times t \qquad \text{Equation (1-1)}$$

a cross-sectional elongation $\Delta l$ of the metal mask in the stretching direction is:

$$\Delta l = \pm F \times l / E \times A \qquad \text{Equation (1-2)}$$

a cross-sectional normal strain $\varepsilon_x$ of the metal mask in the stretching direction is:

$$\varepsilon_x = \Delta l / l = \sigma_x / E \qquad \text{Equation (1-3)}$$

a relationship between the normal strain $\varepsilon_x$ of the metal mask in the stretching direction and a normal strain $\varepsilon_y$ of the metal mask in a direction perpendicular to the stretching direction is:

$$\varepsilon_x = -v_0 \times \varepsilon_y. \qquad \text{Equation (1-4)}$$

Figure 2:
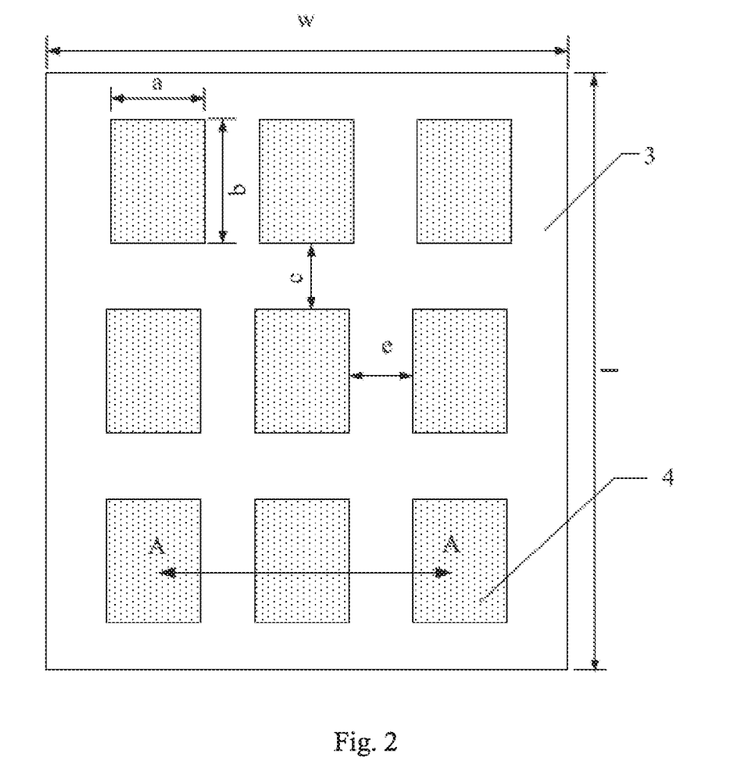
FIG. 2 is a schematic diagram illustrating openings in a metal mask.

However, as shown in FIG. 2, since there are a plurality of openings 4 in the metal mask 3, Young's modulus E and Poisson's ratio $v_0$ thereof may be changed with respect to the original material; the original isotropic material may be changed into an anisotropic material, the specific amount of change is related to the size and density of the openings, Taking the rectangular openings shown in FIG. 2 as an example, the length and the width of each opening are indicated by a and b, respectively, and the density is associated with a longitudinal interval c and a lateral interval e of the openings. After the metal mask has been formed with the openings, the deformation properties of the metal mask in the two directions perpendicular to each other are changed. As for the openings in the metal mask, the stretching direction is an axial direction, and a direction perpendicular to the stretching direction is a lateral direction.

Figure 3:
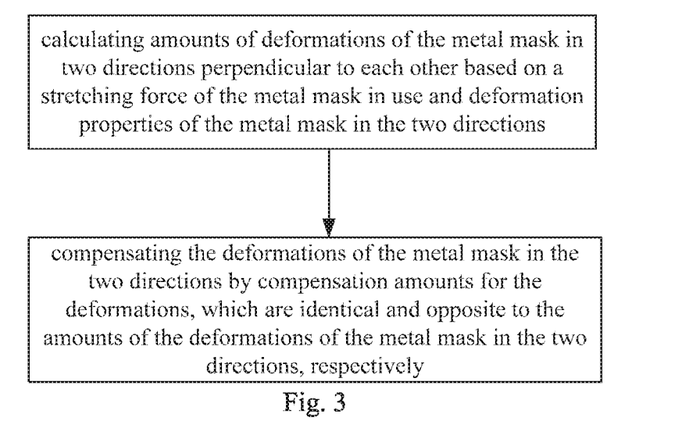
FIG. 3 is a flow chart of a design method of a metal mask according to an embodiment of the present disclosure.

The design method of a metal mask and the manufacturing method of a metal mask in the present embodiment are intended to solve the above problem. As shown in FIG. 3, the design method of the metal mask includes the following steps.

Step S1): calculating amounts of deformations of the metal mask in two directions perpendicular to each other, respectively, according to a stretching force when the metal mask is in use and deformation properties of the metal mask in the two directions perpendicular to each other.

In this step, a step of acquiring the deformation properties of the metal mask in the two directions perpendicular to each other further includes:

Step S11): determining design dimensions of the metal mask.

The design dimensions of the metal mask include a length, a width and a thickness, as well as a cross-sectional area of the opening, a lateral interval and a longitudinal interval of the openings in the metal mask.

Step S12): acquiring material properties of a material for manufacturing the metal mask.

The material properties of the material for manufacturing the metal mask include Young's modulus and Poisson's ratio.

Step S11) and Step S12) obtain the deformation properties of the metal mask in the two direction perpendicular to each other by providing the technical parameters related to the deformation properties, and thus provide the basis for calculating compensation amounts for the deformations.

Step S13): calculating the deformation properties of the metal mask in the two directions perpendicular to each other, according to the design dimensions of the metal mask and the material properties of the material for manufacturing the metal mask.

Since the openings may cause Young's modulus E and Poisson's ratio v of the metal mask to change from those of the original material, taking the rectangular openings shown in FIG. 2 as an example, the deformation properties of the metal mask in the two directions perpendicular to each other are as follows after the openings are formed:

Young's modulus $E_x$ of the metal mask in a stretching direction is:

$$E_x = E \times e/(a+e) \quad \text{Equation (1-5)}$$

Young's modulus $E_y$ of the metal mask in a direction perpendicular to the stretching direction is:

$$E_y = E \times b/(c+b) \quad \text{Equation (1-6)}$$

Poisson's ratio v of the metal mask is:

$$v = v_0 \times l/w \times ((a+e)*(b+c)/(a \cdot b))^{1/2} \quad \text{Equation (1-7)}$$

wherein the width of the metal mask is w, the length of the metal mask is l, the cross-sectional area of the opening in the metal mask is a·b, the lateral interval of the openings is e, the longitudinal interval of the openings is c, the material for manufacturing the metal mask has Young's modulus E and Poisson's ratio $v_0$. In the proportional limit of a material, an absolute value of a ratio of a lateral strain to a longitudinal strain caused by the uniformly distributed longitudinal stress is Poisson's ratio. Calculations with Poisson's ratio will not introduce shear modulus, and thereby can simplify the design.

Step S13) further obtaining Young's modulus and Poisson's ratio related to the deformation properties, and provides the basis for calculating the compensation amounts for the deformations of the mask.

Step S2): compensating the deformations of the metal mask in the two directions perpendicular to each other by compensation amounts for the deformations, which are identical to the amounts of the deformations respectively and have trends opposite to those of the deformations respectively, according to the amounts of the deformations of the metal mask in the two directions perpendicular to each other; that is, performing a negative compensation.

In this step, given that the stretching force on the metal mask is F, then:

a cross-sectional normal stress $\sigma_x$ of the metal mask in the stretching direction is:

$$\sigma_x = F/(w \times t) \quad \text{Equation (1-8)}$$

a cross-sectional elongation Δl of the metal mask in the stretching direction is:

$$\Delta l = \pm F \times l/(E_x \times w \times t) \quad \text{Equation (1-9)}$$

a cross-sectional normal strain $\varepsilon_x$ of the metal mask in the stretching direction is:

$$\varepsilon_x = \Delta l/l = \sigma_x/E_x \quad \text{Equation (1-10)}$$

a relationship between the normal strain $\varepsilon_x$ of the metal mask in the stretching direction and a normal strain $\varepsilon_y$ of the metal mask in a direction perpendicular to the stretching direction is:

$$\varepsilon_x = -v \times \varepsilon_y. \quad \text{Equation (1-11)}$$

By the above steps, the strain parameters related to the deformations are obtained, and the basis for calculating the compensation amounts for the deformations are provided.

On that basis, the compensation amount for the deformation of the metal mask in the stretching direction is:

$$T.R._x = \Delta l/l\% = \sigma_x/E_x\%; \quad \text{Equation (1-12)}$$

the compensation amount for the deformation of the metal mask in the direction perpendicular to the stretching direction is:

$$T.R._y = \Delta w/w\% = \varepsilon_y\% = -T.R._x/v\%, \quad \text{Equation (1-13)}$$

According to the amounts of the deformations in the two directions perpendicular to each other as obtained by the above calculations, the compensation amounts for the deformations may be provided during the design of the mask.

Generally, the metal mask 3 has a shape of rectangle, and the cross section of the opening 4 in the metal mask has a shape of rectangle as shown in FIG. 2, a long side of the opening is in a same direction as that of a long side of the metal mask. In this case, the stretching direction of the metal mask is the direction of the long side thereof, and the direction perpendicular to the stretching direction is the direction of a short side thereof. By giving the relationship between the evaporation openings and the metal mask, it is ensured that the compensation relationship is proper.

It may be appreciated that, with the development of the mask manufacturing technology and the diversification of the designs of the evaporation pattern, the opening in the metal mask may have another shape. In this case, the deformation compensation for two directions perpendicular to each other can also be implemented by using the design method of the metal mask in the present embodiment according to the location of the metal mask in the stretching and welding process, which will not be repeated here.

Accordingly, the present embodiment further provides a manufacturing method of a metal mask for compensating the deformations of the metal mask in two directions perpendicular to each other according to the above design method. Thereby, a metal mask involving compensation amounts for the deformations may be obtained directly by calculation without manufacturing a sample of the mask in advance.

According to the design method of a metal mask in the present embodiment, during the design, the amounts of the deformations of the metal mask in the direction of the long side and the direction of the short side are calculated by using the known material properties of the metal mask, the dimensions of the metal mask and a certain screen tension, and then the compensation amounts required during manufacturing the metal mask is calculated. By this method, the deformations of the long side and the short side of the metal mask can be taken into account during designing and manufacturing, the compensation amounts to be designed for the long side and the short side can be calculated and applied during designing and manufacturing, so that the openings in the metal mask can correspond to the proper locations on the back panel of the thin film transistor even when the metal mask is stretched and deformed, thereby ensuring that the metal mask can work to its best.

The present embodiment provides a design method of a metal mask and correspondingly a manufacturing method of a metal mask in which a metal mask involving the compensation amounts is achieved by obtaining the compensation amounts for the deformations by calculating directly, instead of manufacturing a sample mask in advance. In the present embodiment, the design method of a metal mask and the manufacturing method of a metal mask also provide a correction parameter related to the thickness of the metal mask and an inclination of the opening. The correction parameter $C_1$ is set according to the thickness of the metal mask and the inclination of the opening.

In the present embodiment, Young's modulus $E_x$ of the metal mask in an axial direction is:

$$E_x = E \times e/(a+e) \qquad \text{Equation (2-1)}$$

Young's modulus $E_y$ of the metal mask in a lateral direction is:

$$E_y = E \times b/(c+b) \qquad \text{Equation (2-2)}$$

Poisson's ratio $v$ of the metal mask is:

$$v = v_0 \times l/w \times ((a+e)*(b+c)/(a \cdot b))^{1/2} \qquad \text{Equation (2-3)}$$

Figure 4:
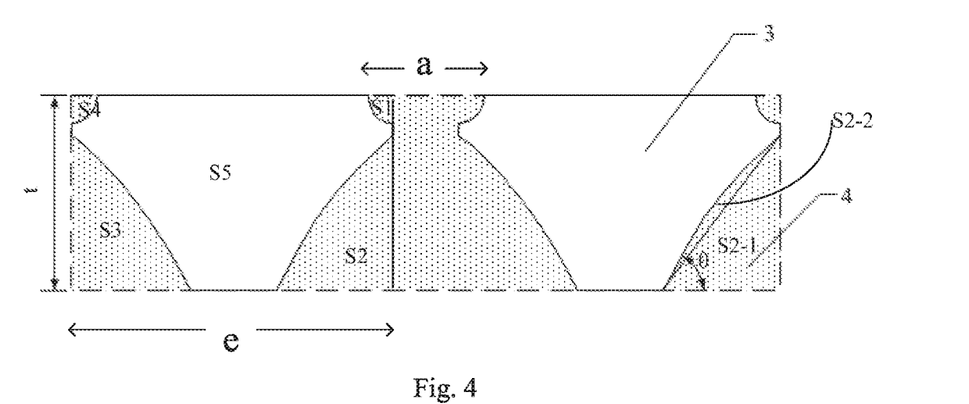
FIG. 4 is a cross-sectional view of etched openings in the metal mask.

The metal mask is typically manufactured by an etching process, and FIG. 4 shows the etched cross section as taken along the section line A-A in FIG. 2. Since the etching process is not exactly anisotropic, the cross section of an opening formed by the etching process is not a regular rectangle. Regions $S_1$, $S_2$, $S_3$ and $S_4$ are regions being etched when two etching processes are performed on the metal mask from the front and reverse sides, respectively. Such processes cause an inclination angle θ of the opening with respect to a plane in which the metal mask is located, and only a region $S_5$ remains between two adjacent openings 4. By setting the correction parameter $C_1$ related to the thickness of the metal mask 3 and the inclination angle θ of the opening 4, more accurate strain parameters are provided. The correction parameter $C_1$ ranges from ½ to ¼.

The correction parameter $C_1$ is defined as follows:

$$S_1 = S_4$$
$$S_2 = S_3$$
$$2S_1 + 2S_2 + S_5 = e*t$$
$$C_1 = \frac{S_5}{e \times t} \qquad \text{Equation (3-1)}$$

wherein $S_5$ is a cross-sectional area of the remaining region between two adjacent openings 4 after being etched, e is a lateral interval of the openings, a is a length of the opening, and t is the thickness of the metal mask.

Furthermore, the correction parameter $C_1$ is related to the inclination angle θ of the opening with respect to the plane in which the metal mask 3 is located, and from Equation (3-1), it is obtained:

$$C_1 = \frac{e \times t - 2(S_1 + S_2)}{e \times t} \qquad \text{Equation (3-2)}$$

wherein, $S_2 = S_{2-1} + S_{2-2} \qquad \text{Equation (3-3)}$

Since the area $S_{2-1}$ is a function of the inclination angle θ, the correction parameter $C_1$ is related to the inclination angle θ of the opening 4.

Taking the above into account, in a case that the stretching force is F, the cross-sectional area of the opening is a·b, the lateral interval of the openings is e, the longitudinal interval of the openings is c, and the correction parameter is $C_1$, a metal mask with a width of w and a length of l has the following:

a cross-sectional normal stress $\sigma_x$ of the metal mask in a stretching direction, which is:

$$\sigma_x = F/(w \times C_1 \times t) \qquad \text{Equation (4-1)}$$

an elongation $\Delta l$ of the metal mask in the stretching direction, which is:

$$\Delta l = \pm F \times l/[E_x \times (w \times C_1 \times t)] \qquad \text{Equation (4-2)}$$

a cross-sectional normal strain $\varepsilon_x$ of the metal mask in the stretching direction, which is:

$$\varepsilon_x = \Delta l/l = \sigma_x/E_x \qquad \text{Equation (4-3)}$$

a relationship between the normal strain $\varepsilon_x$ of the metal mask in the stretching direction (axial direction) and the normal strain $\varepsilon_y$ of the metal mask in the direction (lateral direction) perpendicular to the stretching direction, which is:

$$\varepsilon_x = -v_0 \times \varepsilon_y \qquad \text{Equation (4-4)}$$

Therefore, a compensation amount for the deformation (i.e., a tension ratio) of the metal mask in the stretching direction (axial direction) is:

$$T.R._x = \Delta l/l\% = \sigma_x/E_x\% \qquad \text{Equation (4-5)}$$

a compensation amount for the deformation of the metal mask in the lateral direction is:

$$T.R._y = \Delta w/w\% = \varepsilon_y\% = -T.R._x/v\%. \qquad \text{Equation (4-6)}$$

For example, if it is designed that the stretching force F of the metal mask is 24 N, the length l of the metal mask is 850 mm, the width w of the metal mask is 83 mm, the thickness t of the metal mask is 0.03 mm, Young's modulus E is 141000 N/mm², Poisson's ratio $v_0$ is 0.29, the cross-sectional area of the opening is a=0.041*b=0.037, the lateral interval e of the openings is 0.037, and the longitudinal interval e of the openings is 0.041 mm, then, according to the design method of the metal mask in the present embodiment, it is calculated that:

the axial compensation amount for e deformation is $T.R._x=0.0255\%$; and the lateral compensation amount for the deformation is $T.R._y=-0.0042\%$.

Compared with a design method of a metal mask in the prior art, on the condition that the metal mask has the same design parameters, the measurements of the deformations of a sample metal mask having the same parameters are as follows: $T.R._x=0.02\%$, and $T.R._y=-0.003\%$. It can be seen that the compensation amounts for the deformations obtained by the design method of a metal mask in the present embodiment are highly consistent with the measurements of the deformations of the sample metal mask. Thus, during designing, adding the compensation amounts can cancel out the deformation generated by stretching and welding the metal mask.

Figure 5:
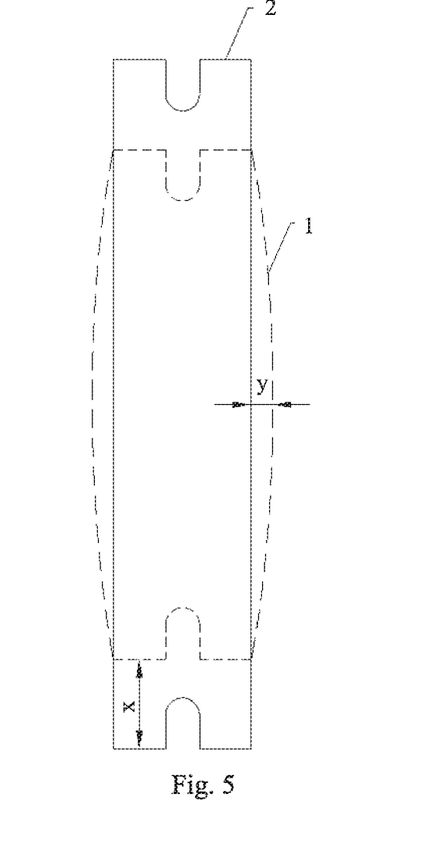
FIG. 5 is a schematic diagram illustrating compensation for the deformation of the metal mask according to an embodiment of the present disclosure.

Accordingly, the present embodiment further provides a manufacturing method of a metal mask. As shown in FIG. 5, the deformations of a metal mask in two directions perpendicular to each other are compensated according to the above design method. The compensation amounts for the deformations for a metal mask can be obtained by calculating directly, instead of manufacturing a sample mask in advance.

According to the design method of a metal mask in the present embodiment, during the design, the amounts of the deformations of the metal mask in the direction of the long side and the direction of the short side are calculated by using the known material properties of the metal mask, the dimensions of the metal mask, the correction parameter related to the thickness of the metal mask and the inclination angle of the opening, and a certain screen tension; and then the compensation amounts required during manufacturing the metal mask is calculated. By this method, the deformations of the long side and the short side of the metal mask can be taken into account during designing and manufacturing, the compensation values to be designed for the long side and the short side can be calculated and applied during designing and manufacturing, so that the openings in the metal mask can correspond to the proper locations on the back panel of the thin film transistor even when the metal mask is stretched and deformed, thereby ensuring that the metal mask can work to its best.

The calculations in the steps of the design method of the metal mask according to the present disclosure may be performed manually, or may be implemented by hardware, software or a combination of hardware and software. In an embodiment, the design method of the metal mask disclosed herein may be implemented by an integrated circuit (IC) with corresponding functions. In another embodiment, the design method of the metal mask disclosed herein may be implemented by a computer and a computer storage medium in the computer which is executable by a processor in the computer, thereby implementing all of or part of the steps in the design method of the metal mask disclosed herein. Descriptions of repeated contents are omitted herein.

Accordingly, a computer-readable storage medium in which computer programs are stored is provided, wherein the computer programs implement, when executed by a processor, all of or part of the steps in the design method of a metal mask of the present disclosure.

Accordingly, the present embodiment further provides a manufacturing method of a metal mask, the deformations of the metal mask in two directions perpendicular to each other are compensated according to the computer programs stored in the above computer storage medium. Thus, the compensation amounts for the deformations for a metal mask can be obtained by calculating directly, instead of manufacturing a sample mask in advance.

Summing up the above, the design method of a metal mask and a manufacturing method of a metal mask provided by the present disclosure obtain the compensation amounts required during manufacturing the metal mask by calculating the tension ratio of the metal mask, and perform compensating during designing the metal mask. Since the amounts of the deformations of the metal mask are taken into consideration in the early stage of the design of a metal mask, the metal mask involving the compensation amounts may be obtained, and the process cost of the metal mask is decreased.

It will be appreciated that the above implementations are exemplary implementations simply for illustrating the principle of the present invention. However, the present invention is not limited thereto. An ordinary person skilled in the art may make various modifications and variations without departing from the spirit and scope of the present invention. The present invention is intended to encompass these modifications and variations.

What is claimed is:

1. A manufacturing method of a metal mask, comprising steps of:

calculating amounts of deformations of the metal mask in two directions perpendicular to each other based on a stretching force of the metal mask in use and properties of the deformations of the metal mask in the two directions; and calculating compensation amounts for the deformations of the metal mask in the two directions by compensation amounts for the deformations, which are identical and opposite to the amounts of the deformations of the metal mask in the two directions, respectively, and manufacturing the metal mask based on results of the calculating compensation amounts, wherein the manufacturing method further comprises a step of acquiring the properties of the deformations of the metal mask in the two directions, which comprises:

determining design dimensions of the metal mask;

acquiring material properties of a material for manufacturing the metal mask; and calculating the properties of the deformations of the metal mask in the two directions based on the design dimensions of the metal mask and the material properties of the material for manufacturing the metal mask, wherein the design dimensions of the metal mask comprise a length, a width and a thickness of the metal mask, a cross-sectional area of an opening in the metal mask, a lateral interval and a longitudinal interval between two adjacent openings in the metal mask; and the material properties of the material for manufacturing the metal mask comprise Young's modulus and Poisson's ratio, wherein the properties of the deformations of the metal mask in the two directions comprise:

Young's modulus $E_x$ of the metal mask in a stretching direction, which is:

$$E_x = E \times e/(a+e);$$

Young's modulus $E_y$ of the metal mask in a direction perpendicular to the stretching direction, which is:

$$E_y = E \times b/(c+b); \text{ and}$$

Poisson's ratio v of the metal mask, which is:

$$v = v_0 \times l/w \times ((a+e)*(b+c)/(a \cdot b))^{1/2},$$

wherein the width of the metal mask is w, the length of the metal mask is l, the cross-sectional area of the opening is a·b, the lateral interval is e, the longitudinal interval is c, the material for manufacturing the metal mask has Young's modulus E and Poisson's ratio $v_0$, wherein the stretching force applied to the metal mask is F, and the properties of the deformations further comprise:

a cross-sectional normal stress $\sigma_x$ the metal mask in the stretching direction, which is:

$$\sigma_x = F/(w \times t);$$

a cross-sectional elongation $\Delta l$ of the metal mask in the stretching direction, which is:

$$\Delta l = \pm F \times l/(E_x \times w \times t);$$

a cross-sectional normal strain $\varepsilon_x$ of the metal mask in the stretching direction, which is:

$$\varepsilon_x = \Delta l/l = \sigma_x/E_x; \text{ and}$$

a relationship between the normal strain $\varepsilon_x$ of the metal mask in the stretching direction and a normal strain $\varepsilon_y$ of the metal mask in a direction perpendicular to the stretching direction, which is:

$$\varepsilon_x = -\nu \times \varepsilon_y,$$

wherein, t is the thickness of the metal mask,
wherein, taking a correction parameter $C_1$ into account, the properties of the deformations further comprise:
the cross-sectional normal stress $\sigma_x$ of the metal mask in the stretching direction, which is:

$$\sigma_x = F/(w \times C_1 \times t);$$

the cross-sectional elongation $\Delta l$ of the metal mask in the stretching direction, which is:

$$\Delta l = \pm F \times l/[E_x \times (w \times C_1 \times t)];$$

the cross-sectional normal strain $\varepsilon_x$ of the metal mask in the stretching direction, which is:

$$\varepsilon_x = \Delta l/l = \sigma_x/E_x; \text{ and}$$

the relationship between the normal strain $\varepsilon_x$ of the metal mask in the stretching direction and the normal strain $\varepsilon_y$ of the metal mask in the direction perpendicular to the stretching direction, which is:

$$\varepsilon_x = -\nu \times \varepsilon_y,$$

wherein the correction parameter $C_1$ is related to an etching process for forming the opening, two etching processes are performed on the metal mask from front and reverse sides, respectively, and a size of the opening along a direction parallel to a plane in which the metal mask is located first increases and then decreases along a thickness direction of the metal mask,
wherein a compensation amount for the deformation of the metal mask in the stretching direction is:

$$T.R._x = \Delta l/l\% = \sigma_x/E_x\%; \text{ and}$$

a compensation amount for the deformation of the metal mask in the direction perpendicular to the stretching direction is:

$$T.R._y = \Delta w/w\% = \varepsilon_y\% = -T.R._x/\nu\%,$$

wherein the manufacturing method further comprises:
obtaining values of a long side and a short side of the metal mask during manufacturing, according to the compensation amount for the deformation of the metal mask in the stretching direction and the compensation amount for the deformation of the metal mask in the direction perpendicular to the stretching direction, respectively, so that the opening in the metal mask correspond to a corresponding location on a back panel of thin film transistors when the metal mask is stretched and deformed, and
forming the opening in the metal mask by two etching processes performed on the metal mask from front and reverse sides of the metal mask, respectively, such that an inclination angle of the opening with respect to the plane, in which the metal mask is located, is formed.

2. The manufacturing method of claim 1, wherein the correction parameter $C_1$ is related to the thickness of the metal mask and the inclination angle of the opening with respect to the plane in which the metal mask is located.

3. The manufacturing method of claim 1, wherein the correction parameter $C_1$ ranges from ½ to ¼.

4. The manufacturing method of claim 1, wherein a cross section of the opening is rectangular, a long side of the opening is in a same direction as that of the long side of the metal mask; the stretching direction of the metal mask is a direction of the long side thereof, and the direction perpendicular to the stretching direction is a direction of the short side thereof.

5. A computer-readable storage medium in which computer programs are stored, wherein the computer programs implement, when executed by a processor, the following steps:
calculating amounts of deformations of the metal mask in two directions perpendicular to each other based on a stretching force of the metal mask in use and properties of the deformations of the metal mask in the two directions; and
calculating compensation amounts for the deformations of the metal mask in the two directions by compensation amounts for the deformations, which are identical and opposite to the amounts of the deformations of the metal mask in the two directions, respectively, and manufacturing the metal mask based on results of the calculating compensation amounts,
wherein the computer programs further implement, when executed by a processor, the following steps:
determining design dimensions of the metal mask;
acquiring material properties of a material for manufacturing the metal mask; and
calculating the properties of the deformations of the metal mask in the two directions based on the design dimensions of the metal mask and the material properties of the material for manufacturing the metal mask,
wherein the design dimensions of the metal mask comprise a length, a width and a thickness of the metal mask, a cross-sectional area of an opening in the metal mask, a lateral interval and a longitudinal interval between two adjacent openings in the metal mask; and
the material properties of the material for manufacturing the metal mask comprise Young's modulus and Poisson's ratio,
wherein the computer programs further implement, when executed by a processor, calculating the properties of the deformations of the metal mask in the two directions:
Young's modulus $E_x$ of the metal mask in a stretching direction, which is:

$$E_x = E \times e/(a+e);$$

Young's modulus $E_y$ of the metal mask in a direction perpendicular to the stretching direction, which is:

$$E_y = E \times b/(c+b); \text{ and}$$

Poisson's ratio $\nu$ of the metal mask, which is:

$$\nu = \nu_0 \times l/w \times ((a+e)*(b+c)/(a \cdot b))^{1/2},$$

wherein the width of the metal mask is w, the length of the metal mask is l, the cross-sectional area of the opening is a·b, the lateral interval is e, the longitudinal interval is c, the material for manufacturing the metal mask has Young's modulus E and Poisson's ratio $\nu_0$, wherein, the stretching force applied to the metal mask is F, and the properties of the deformations further comprise:

a cross-sectional normal stress $\sigma_x$ of the metal mask in the stretching direction, which is:

$\sigma_x = F/(w \times t)$;

a cross-sectional elongation $\Delta l$ of the metal mask in the stretching direction, which is:

$\Delta l = \pm F \times l/(E_x \times w \times t)$;

a cross-sectional normal strain $\varepsilon_x$ of the metal mask in the stretching direction, which is:

$\varepsilon_x = \Delta l/l = \sigma_x/E_x$; and a relationship between the normal strain $\varepsilon_x$ of the metal mask in the stretching direction and a normal strain $\varepsilon_y$ of the metal mask in a direction perpendicular to the stretching direction, which is:

$\varepsilon_x = -\nu \times \varepsilon_y$, wherein, t is the thickness of the metal mask, wherein the computer programs further implement, when executed by a processor, the following: taking a correction parameter $C_1$ into account, the properties of the deformations further comprise:

the cross-sectional normal stress $\sigma_x$ of the metal mask in the stretching direction, which is:

$\sigma_x = F/(w \times C_1 \times t)$;

the cross-sectional elongation $\Delta l$ of the metal mask in the stretching direction, which is:

$\Delta l = \pm F \times l/[E_x \times (w \times C_1 \times t)]$;

the cross-sectional normal strain $\varepsilon_x$ of the metal mask in the stretching direction, which is:

$\varepsilon_x = \Delta l/l = \sigma_x/E_x$; and the relationship between the normal strain $\varepsilon_x$ of the metal mask in the stretching direction and the normal strain $\varepsilon_y$ of the metal mask in the direction perpendicular to the stretching direction, which is:

$\varepsilon_x = -\nu \times \varepsilon_y$, wherein the correction parameter $C_1$ is related to an etching process for forming the opening, two etching processes are performed on the metal mask from front and reverse sides, respectively, and a size of the opening along a direction parallel to a plane in which the metal mask is located first increases and then decreases along a thickness direction of the metal mask, wherein a compensation amount for the deformation of the metal mask in the stretching direction is:

$T.R._x = \Delta l/l\% = \sigma_x/E_x\%$; and a compensation amount for the deformation of the metal mask in the direction perpendicular to the stretching direction is:

$T.R._y = \Delta w/w\% = \varepsilon_y\% = -T.R._x/\nu\%$ wherein the computer programs further implement, when executed by the processor, the following steps:

obtaining values of a long side and a short side of the metal mask during manufacturing, according to the compensation amount for the deformation of the metal mask in the stretching direction and the compensation amount for the deformation of the metal mask in the direction perpendicular to the stretching direction, respectively, so that the opening in the metal mask correspond to a corresponding location on a back panel of thin film transistors when the metal mask is stretched and deformed, and forming the opening in the metal mask by two etching processes performed on the metal mask from front and reverse sides of the metal mask, respectively, such that an inclination angle of the opening with respect to the plane, in which the metal mask is located, is formed.

6. The computer-readable storage medium of claim 5, wherein the correction parameter $C_1$ ranges from ½ to ¼.

* * * * *